(12) United States Patent
Murade

(10) Patent No.: US 7,315,297 B2
(45) Date of Patent: Jan. 1, 2008

(54) ELECTRO-OPTICAL APPARATUS AND ELECTRONIC SYSTEM

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 787 days.

(21) Appl. No.: 10/853,290

(22) Filed: May 26, 2004

(65) Prior Publication Data

US 2005/0012706 A1    Jan. 20, 2005

(30) Foreign Application Priority Data

Jun. 12, 2003    (JP)    ............................. 2003-168066

(51) Int. Cl.
G09G 3/36    (2006.01)
G09G 5/00    (2006.01)

(52) U.S. Cl. ........................................ 345/99; 345/206

(58) Field of Classification Search .......... 345/98–100, 345/204, 206, 213

See application file for complete search history.

(56) References Cited

U.S. PATENT DOCUMENTS

| 5,148,301 | A | 9/1992 | Sawatsubashi et al. |
|---|---|---|---|
| 5,206,634 | A | 4/1993 | Matsumoto et al. |
| 6,731,260 | B2 | 5/2004 | Jinno et al. |
| 6,760,005 | B2 * | 7/2004 | Koyama et al. ............... 345/98 |
| 6,862,008 | B2 | 3/2005 | Yamazaki et al. |
| 6,894,674 | B2 | 5/2005 | Nakajima et al. |
| 6,999,055 | B2 * | 2/2006 | Yamashita et al. ............ 345/98 |
| 7,151,538 | B2 * | 12/2006 | Yamashita et al. ........... 345/213 |
| 7,227,522 | B2 * | 6/2007 | Fujimoto et al. .............. 345/87 |
| 2003/0043104 | A1 * | 3/2003 | Lee et al. ...................... 345/92 |
| 2004/0246216 | A1 * | 12/2004 | Hosaka ......................... 345/87 |
| 2005/0057580 | A1 * | 3/2005 | Yamano et al. .............. 345/690 |

FOREIGN PATENT DOCUMENTS

| JP | A-03-110486 | 5/1991 |
|---|---|---|
| JP | A-04-140716 | 5/1992 |
| JP | U-03-110486 | 11/1992 |
| JP | A-07-168151 | 7/1995 |
| JP | A-07-318902 | 12/1995 |
| JP | A-08-062581 | 3/1996 |
| JP | A-11-194367 | 7/1999 |
| JP | A 11-282397 | 10/1999 |
| JP | A-2000-206943 | 7/2000 |
| JP | A 2001-166743 | 6/2001 |
| JP | A-2002-175021 | 6/2002 |
| JP | A-2003-058075 | 2/2003 |

* cited by examiner

*Primary Examiner*—Sumati Lefkowitz
*Assistant Examiner*—Rodney Amadiz
(74) *Attorney, Agent, or Firm*—Oliff & Berridge, PLC

(57) ABSTRACT

The invention provides an electro-optical apparatus that can include a clock-signal terminal and a phase-difference correction circuit that are connected without branching, and the phase-difference correction circuit and one of scanning-line drive circuits are connected without branching. A clock signal can be supplied to the one of the scanning-line drive circuits through the phase-difference correction circuit. Then the one of the scanning-line drive circuits and the other of the scanning-line drive circuits are connected without branching, and a clock-signal line which supplies the clock signal from the one of the scanning-line drive circuits to the other of the scanning-line drive circuits can be provided.

13 Claims, 12 Drawing Sheets

X DIRECTION
Y DIRECTION

ELECTRO-OPTICAL APPARATUS AND ELECTRONIC SYSTEM

BACKGROUND OF THE INVENTION

1. Field of Invention

The present invention pertains to technical fields of an electro-optical apparatus, such as a liquid-crystal device or the like, and an electronic system, such as a liquid-crystal projector or the like which comprises the electro-optical apparatus.

2. Description of Related Art

The electro-optical apparatus can be configured such that, for example, scanning signals are output in sequence on the scanning lines from the shift registers provided in a drive circuit such as a scanning-line drive circuit or the like. In the drive circuit configuration like this, in general, the scanning signals from the shift register are output in synchronization with the clock cycles of a clock signal and the inverted clock signal produced by inverting the clock signal which are supplied to the scanning-line drive circuit. Here, in general, the phase difference between the clock signal and the inverted clock signal is more or less deviated from 180 degrees, which is an ideal phase difference corresponding to the inverted state, in accordance with the method of generating the signals.

There have been developments in techniques of providing a phase-difference correction circuit which corrects the phase difference between the clock signal and the inverted clock signal before a clock signal and the inverted clock signal are input into the shift register circuit. With these techniques, a clock signal and the inverted clock signal, which are very close to an inversion state, can be obtained, and thereby making it possible to perform a driving operation in the scanning-line drive circuit with high precision.

As described above, the phase-difference correction circuit is disposed in the surrounding area of the image-display area on a device substrate. However, depending on the method of disposing the phase-difference correction circuit or the wiring method of the signal lines connected to the circuit, a relatively wide space needs to be secured on the device substrate for wiring line layout and circuit layout. As a result, there is a problem in that the miniaturization of the entire electro-optical apparatus becomes difficult.

In addition, for example, the scanning-line drive circuit described above is sometimes formed across the image-display area by being divided on both sides thereof in accordance with the driving power for a plurality of scanning lines. In such a case, a method is considered of providing the phase-difference correction circuits and the connection terminals with an external circuit corresponding to individual scanning-line drive circuits formed by being divided into two. However, in this method, the space for the phase-difference correction circuits and each of the signal wiring connecting these circuits further becomes necessary. Also, the external circuits need to have the terminals corresponding to the added connection terminals. Accordingly, in this method, there is a problem of encountering an obstacle when miniaturizing a device substrate or miniaturizing the entire electro-optical apparatus.

SUMMARY OF THE INVENTION

The invention provides an electro-optical apparatus which is provided with a drive circuit capable of appropriately operating by the phase-difference correction circuit, at the same time, can be miniaturized as the entire apparatus, and to provide various electronic systems comprising the electro-optical apparatus.

In order to solve the above-described problems, a first electro-optical apparatus according to the invention can include, in an image-display area on a device substrate, a plurality of data lines extending in a certain direction, and a plurality of scanning lines extending in a direction intersecting the data lines. The first electro-optical apparatus includes, in a surrounding area located on the surroundings of the image-display area, a first drive circuit which drives wiring lines either of the scanning lines or the data lines based on a first clock signal and a second clock signal having a phase inverted from the first clock signal. Also, the first electro-optical apparatus can include a second drive circuit which is disposed by being opposed to the first drive circuit across the image-display area, at the same time, is electrically connected to the other ends of the wiring lines, and drives the wiring lines based on the first and second clock signals. Also, the first electro-optical apparatus includes first and second terminals to which the first and second clock signals are respectively supplied from an external circuit. Furthermore, the first electro-optical apparatus can include a phase-difference correction circuit which is provided between the first and second terminals and the first drive circuit and corrects the phase difference between the first and second clock signals. The first electro-optical apparatus includes a first signal line which electrically connects the first terminal to the phase-difference correction circuit without branching, also electrically connects the phase-difference correction circuit to the first drive circuit without branching, supplies the first clock signal from the first terminal to the first drive circuit through the phase-difference correction circuit, at the same time, electrically connects the first drive circuit to the second drive circuit without branching, and supplies the first clock signal from the first drive circuit to the second drive circuit. Furthermore, the first electro-optical apparatus includes a second signal line which electrically connects the second terminal to the phase-difference correction circuit without branching, also electrically connects the phase-difference correction circuit to the first drive circuit without branching, supplies the second clock signal from the second terminal to the first drive circuit through the phase-difference correction circuit, at the same time, electrically connects the first drive circuit to the second drive circuit without branching, and supplies the second clock signal from the first drive circuit to the second drive circuit.

According to the first electro-optical apparatus of the invention, when operating, scanning signals are supplied through the scanning lines from the drive circuit, for example, a scanning-line drive circuit provided in the surrounding area, and image signals are supplied through the data lines from the drive circuit, for example, a data-line drive circuit, or the like to a pixel part provided in the image-display area. Image display is performed by these. The drive circuit like this includes the first drive circuit which is electrically connected to one ends of the wiring lines either of the scanning-lines or the data lines, and the second drive circuit which is electrically connected to the other ends of the wiring lines. Each of the first and second drive circuits drives the wiring lines based on the first clock signal and the second clock signal, which is the inverted-phase signal of the first clock signal. At this time, the first and second drive circuits are disposed across the image-display area by being opposed to each other, and may be adapted to drive, for example, in the case of the wiring lines being the scanning lines, a same scanning line at the both ends thereof. Alternatively, the first and second drive circuits may be adapted such that, out of an array of a plurality of the scanning lines, the 2n-th (note that n=1, 2, 3, . . . ) scanning line is driven at one end thereof by the first drive circuit, and the (2n−1)-th scanning line is driven at the other end thereof by the second drive circuit, respectively.

During such an operation, the phase-difference correction circuit corrects the phase difference between the first clock signal and the second clock signal before input into the first and second drive circuits. Accordingly, it becomes possible to input the first and second clock signals, which are very close to ideal states of having an expected phase difference (for example, a phase difference of 180 degrees), into the individual drive circuits, and thereby the each drive circuit can perform the drive operation with high precision.

Here, in particular, the first signal line electrically connects the section between the first terminal, to which the first clock signal is supplied from the external circuit, and the phase-difference correction circuit, the section between the phase-difference correction circuit and the first drive circuit, and the section between the first drive circuit and the second drive circuit, without branching. At the same time, similarly, the second signal line electrically connects the section between the second terminal, to which the second clock signal is supplied, and the phase-difference correction circuit, the section between the phase-difference correction circuit and the first drive circuit, and the section between the first drive circuit and the second drive circuit, without branching. By such electrical connections, it is possible to have a configuration in which the first and second terminals, the phase-difference correction circuit, the first drive circuit, and the second drive circuit are connected and disposed in series in this order through a pair of the first and second signal lines extended without branching in the surrounding area of the device substrate. Accordingly, it is possible to relatively simplify the wiring of the first and second signal lines in the surrounding area of the image-display area on the device substrate.

As a result, according to the first electro-optical apparatus of the invention, it becomes possible for the first and second drive circuits, which drive the scanning lines or the data lines, to appropriately operate owing to the phase-difference correction circuit. Also, by simplifying the planar layouts of these circuits, and the first and second signal lines in the surrounding area, the miniaturization of the device substrate and thus the entire device becomes possible.

In order to solve the above-described problems, a second electro-optical apparatus according to the invention includes, in an image-display area on a device substrate, a plurality of data lines extending in a certain direction and a plurality of scanning lines extending in a direction intersecting the data lines. The second electro-optical apparatus includes, in a surrounding area located in the surroundings of the image-display area, a first drive circuit which drives wiring lines either of the scanning lines or the data lines based on a first clock signal and a second clock signal having a phase inverted from the first clock signal. Also, the second electro-optical apparatus includes a second drive circuit which is disposed by being opposed to the first drive circuit across the image-display area, at the same time, is electrically connected to the other ends of the wiring lines, and drives the wiring lines based on the first and second clock signals. Also, the second electro-optical apparatus includes first and second terminals to which the first and second clock signals are respectively supplied from an external circuit. Furthermore, the second electro-optical apparatus includes a phase-difference correction circuit which is provided between the first and second terminals and the first and second drive circuits and corrects the phase difference between the first and second clock signals.

The second electro-optical apparatus can include a first signal line which electrically connects the first terminal to the phase-difference correction circuit without branching, also electrically connects the phase-difference correction circuit to the first and second drive circuits individually, and supplies the first clock signal from the first terminal to the first and second drive circuits individually through the phase-difference correction circuit. The second electro-optical apparatus can also include a second signal line which electrically connects the second terminal to the phase-difference correction circuit without branching, also electrically connects the phase-difference correction circuit to the first and second drive circuits individually, and supplies the second clock signal from the second terminal to the first and second drive circuits through the phase-difference correction circuit.

According to the second electro-optical apparatus of the invention, in the same manner as the first electro-optical apparatus described above, the wiring lines are driven and images are displayed based on the first and second clock signals whose phases are corrected.

Here, in particular, the first signal line electrically connects the section between the first terminal, to which the first clock signal is supplied from the external circuit, and the phase-difference correction circuit without branching. The second signal line electrically connects the section between the second terminal, to which the second clock signal is supplied, and the phase-difference correction circuit without branching. Furthermore, the first signal line electrically connects the section between the phase-difference correction circuit and the first and second drive circuits individually. Similarly, the second signal line electrically connects the section between the phase-difference correction circuit and the first and second drive circuits individually. At this time, the phase-difference correction circuit may have the two systems of output terminals corresponding to the first and second signal lines, respectively. Alternatively, the first and second signal lines may individually branch in the middle.

With this configuration, the first and second clock signals, whose phase difference is corrected with each other, can be supplied from the one phase-difference correction circuit to the first and second drive circuits individually. Here, for example, assuming that two phase-difference correction circuits are provided corresponding to the first and second drive circuits, respectively, the first and second signal lines must be individually branched in the middle of the sections from the first and second terminals to the phase-difference correction circuits, or the first and second signal lines and the first and second terminals corresponding to the two phase-difference correction circuits become necessary. As compared with such a case, in the invention, it is not necessary to secure additional space on the device substrate. Also, it is possible to simplify the configuration on the device substrate.

As a result, according to the second electro-optical apparatus of the invention, it becomes possible for the first and second drive circuits, which drive the scanning lines or the data lines, to appropriately operate owing to the phase-difference correction circuit. Also, by simplifying the planar layouts of these circuits and the first and second signal lines in the surrounding area, the miniaturization of the device substrate, and thus the entire device becomes possible.

In one aspect of the second electro-optical apparatus of the invention, the phase-difference correction circuit is disposed at a position symmetrical to the first and second drive circuits.

With this aspect, the phase-difference correction circuit is disposed in the surrounding area on the device substrate, for example, at a position corresponding to a side adjacent to the two sides of the image-display area corresponding to the first and second drive circuits. At this time, with respect to the first signal line or the second signal line, the phase-difference correction circuit is disposed such that the wiring line distance between the phase-difference correction circuit and the first drive circuit and the wiring line distance between the phase-difference correction circuit and the second drive circuit become equal. With this configuration, even if a signal delay in accordance with the wiring line distance occurs to an uningnorable extent, it is possible to prevent the occurrence of the difference in the driving timing between the first and second drive circuits. Thus, the adverse effect by the signal delay described above is not revealed. As description above, it is practically very advantageous to dispose the phase-difference correction circuit at a symmetrical position.

In another aspect of the second electro-optical apparatus of the invention, the first signal line electrically connects the phase-difference correction circuit to the first and second drive circuits individually without branching, and the second signal line electrically connects the phase-difference correction circuit to the first and second drive circuits individually without branching.

With this aspect, the first signal line electrically connects the section between the first terminal, to which the first clock signal is supplied from the external circuit, and the phase-difference correction circuit, and the section between the phase-difference correction circuit and the first drive circuit without branching. At the same time, the second signal line electrically connects the section between the second terminal, to which the second clock signal is supplied, and the phase-difference correction circuit, and the section between the phase-difference correction circuit and the first drive circuit without branching. Accordingly, it is possible to relatively simplify the wiring of the first and second signal lines in the surrounding area of the image-display area on the device substrate.

In another aspect of the first or the second electro-optical apparatus of the invention, the apparatus further includes a counter substrate disposed by being opposed to the device substrate. The device substrate and the counter substrate are bonded with each other by a sealing material in the surrounding area, and the first and second drive circuits are disposed in the surrounding area inside the periphery of a sealing area in which the sealing material is disposed.

With this aspect, the first and second drive circuits are disposed inside the periphery of the sealing area, which has been a dead space so far, in the surrounding area on the device substrate. Accordingly, further miniaturization of the device substrate and thus the entire device becomes possible.

In this aspect, the phase-difference correction circuit may be disposed inside the periphery of the sealing area in the surrounding area. With this disposition, further miniaturization of the device substrate, and thus the entire device becomes possible.

Alternatively, in this aspect, at least part of the first and second signal lines may be disposed inside the periphery of the sealing area in the surrounding area. With this disposition, further miniaturization of the device substrate, and thus the entire device becomes possible.

In another aspect of the first or the second electro-optical apparatus of the invention, a plurality of the first signal lines and a plurality of the second signal lines are arranged in part of the surrounding area extending in a certain direction close to each other and by turns.

With this aspect, the first and second signal lines are connected to a plurality of drive circuits, such as the scanning-line drive circuits which drive the scanning-lines, and the data-line drive circuits which drive the data-lines. Furthermore, the first and second signal lines are wired including meandering in as inner area of the surrounding area as possible, that is to say, the area closer to the image-display area in order to reduce the space to occupy on the device substrate. Thus, in part of the surrounding area, there is an area in which a plurality of the first and the second signal lines are extended in a certain direction close to each other. Here, particularly in such an area, a plurality of the first and second signal lines are arranged by turns. In general, if one signal line for transferring a clock signal and another signal line for transferring a clock signal having the same phase thereof are disposed close to each other, clock noises generated by the individual signal lines are sometimes amplified with each other. However, as in this aspect, by alternately disposing the first and second signal lines having opposite phases with each other, the clock noises are canceled, thereby making it possible to prevent the operation troubles of the drive circuits. Accordingly, in this aspect, it is very advantageous to reduce the noises.

The electro-optical apparatus of the invention can include a liquid-crystal device, an electrophoretic device such as an electronic paper, an EL (electroluminescence) device, and the like.

In order to solve the above-described problems, the electronic system of the invention includes the above-described electro-optical apparatus of the invention.

Since the electronic system of the invention includes the above-described electro-optical apparatus of the invention, various electronic systems, such as projection display devices, liquid-crystal televisions, mobile phones, electronic diaries, word processors, view-finder or monitor direct-view-type video cassette recorders, workstations, videophones, POS terminals, and touch panels can be achieved, all of which can achieve a high-quality image display.

Such operations and other advantages of the invention will be apparent from the embodiments described below.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

In the following, a description will be given of embodiments of the invention based on the drawings. In the following embodiments, an electro-optical apparatus of the invention is applied to a liquid-crystal device of a TFT active-matrix driving method.

A description will be given of an electro-optical apparatus according to a first embodiment of the invention with reference to FIGS. 1 to 10.

Figure 1:
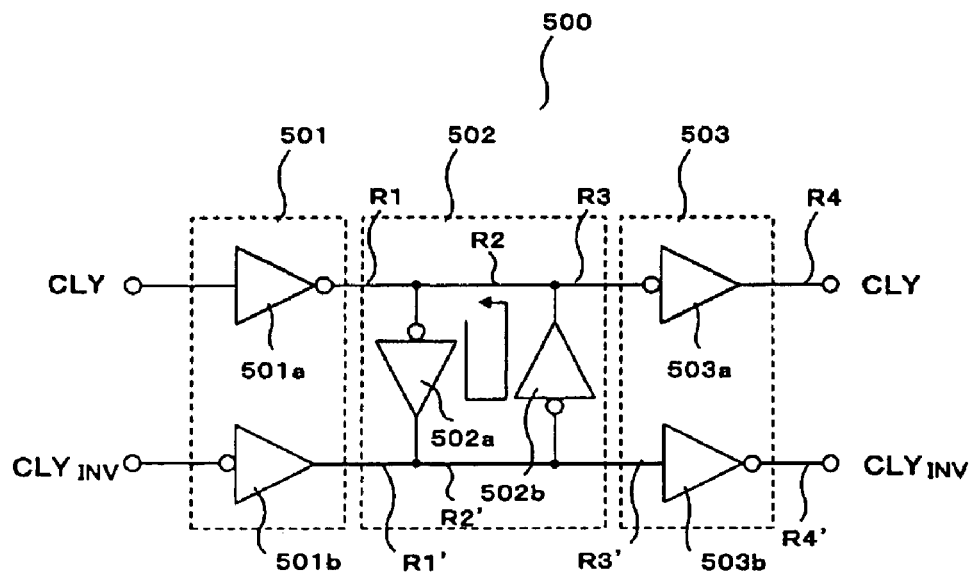
FIG. 1 is an exemplary circuit diagram illustrating the configuration of a clock-signal phase difference correction circuit of an electro-optical apparatus according to the present invention.
Figure 2:
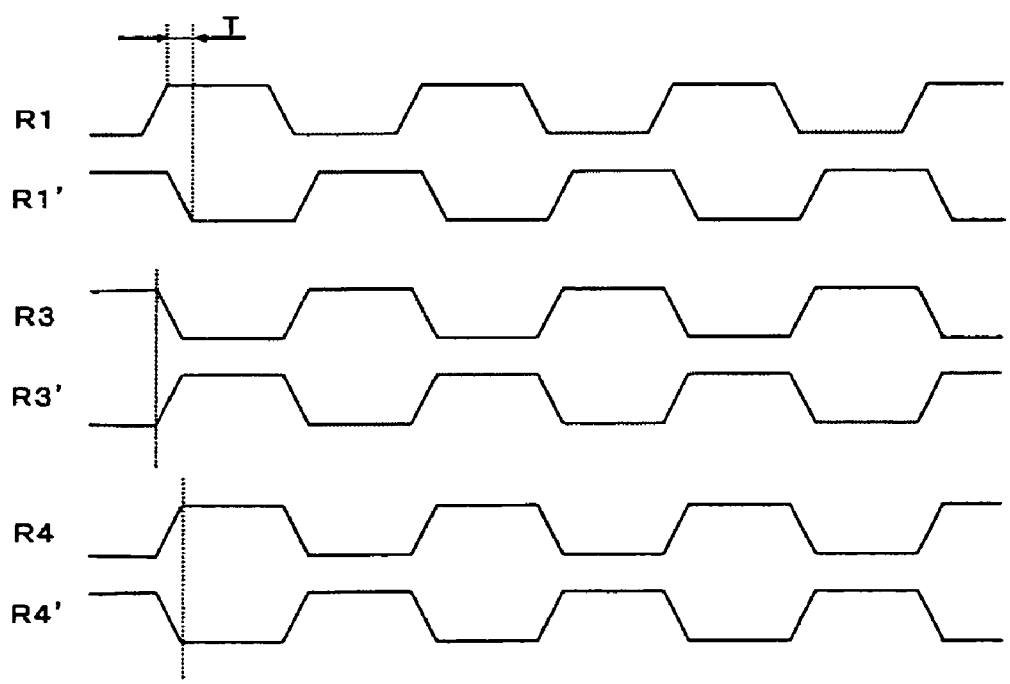
FIG. 2 is a timing chart illustrating the signal of each position in the clock-signal phase difference correction circuit of FIG. 1.
Figure 3:
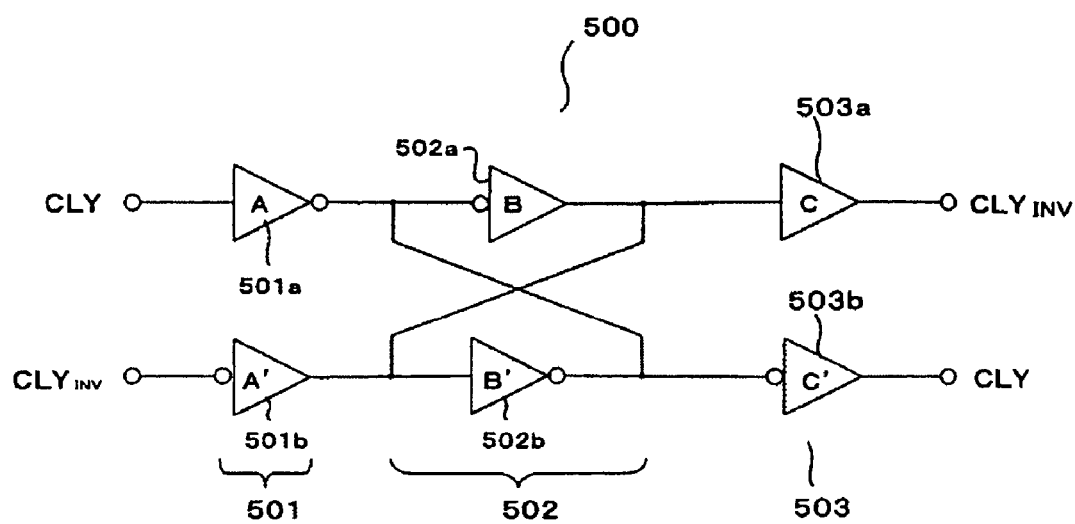
FIG. 3 is an exemplary circuit diagram for explaining the load capacitance of each signal path in the clock-signal phase difference correction circuit.
Figure 4:
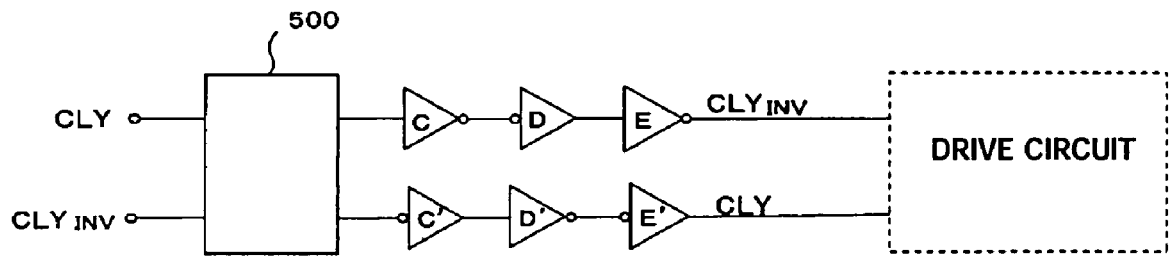
FIG. 4 is an exemplary circuit diagram when a second buffer circuit includes multistage inverter circuits in the clock-signal phase difference correction circuit.

First, a description will be given of the configuration and the operation of a clock-signal phase difference correction circuit according to the embodiment with reference to FIGS. 1 to 4. Here, FIG. 1 is an exemplary circuit diagram illustrating the configuration of the clock-signal phase difference correction circuit according to the embodiment. FIG. 2 is a timing chart illustrating the time-series changes of the various signals related to the circuit. FIG. 3 is an exemplary circuit diagram for explaining the load capacitance of each signal path in the clock-signal phase difference correction circuit. FIG. 4 is an exemplary circuit diagram when a second buffer circuit includes multistage inverter circuits in the clock-signal phase difference correction circuit according to the present embodiment.

In the electro-optical apparatus of the embodiment, in particular, a clock-signal phase difference correction circuit 500 having a bistable circuit is provided between CLY and $CLY_{INV}$, which are input parts to be supplied with a clock signal and an inverted-phase clock signal, and each of the drive circuits described in detail below.

The clock-signal phase difference correction circuit 500 corrects the phases of the clock signal CLY and the inverted-phase clock signal $CLY_{INV}$ which are supplied from an external control circuit, and then supplies the output to each drive circuit. Accordingly, it becomes possible to drive each drive circuit normally or with high precision without causing an erroneous operation.

More specifically, as shown in FIG. 1, the clock-signal phase difference correction circuit 500 of the embodiment can include a first buffer circuit 501, a bistable circuit 502, and a second buffer circuit 503. The circuits include inverters 501a, 501b, 502a, 502b, 503a, and 503b, respectively.

As shown in FIG. 2, even when the clock signal CLY has a phase difference by a period T with respect to the inverted-phase clock signal $CLYs_{INV}$ at the points R1 and R1', the phase difference is corrected by the bistable circuit 502 of the embodiment, and thus there is hardly any or practically no occurrence of the phase difference at the output points R3 and R3' from that bistable circuit 502.

In the clock-signal phase difference correction circuit 500, the buffer circuit 501, which can include the inverters 501a and 502b, compensates the driving capability of the transistor in the circuit supplying the clock signal CLY and the inverted-phase clock signal $CLY_{INV}$, at the same time, the output the inverter 502a of the bistable circuit 502 is supplied to the inverters 502b and the output of the inverter 502b is supplied to the inverter 502a, respectively, and thus the input signals of the individual inverters 502a and 502b are positively fed back to reduce the phase difference.

Also, in the clock-signal phase difference correction circuit 500, the bistable circuit 502 can be followed by the second buffer circuit 503, which serves to prevent a decrease in the driving capability of the bistable circuit 502.

As shown in FIG. 3, it is preferable to design the clock-signal phase difference correction circuit 500 such that the capacitance load of the signal transmission path formed by the inverters A, B and C or the inverters A', B' and C' becomes equal to that of the signal transmission path formed by the inverters A and C' or the inverters A' and C. Accordingly, it is preferable to design that the inverters A, A', B and B' have nearly the same size. This is for performing the phase difference correction without fail by preventing the potential of either of the paths from becoming dominant.

As shown in FIG. 4, for example, when the capacitance added to the clock signal line and the inverted-phase clock signal line is large, some stages of inverter circuits may be cascade connected, and then connected to the clock signal line and the inverted-phase clock signal line. At this time, the inverter circuits to be cascade connected are designed so as to have two to four times the size of the pre-stage inverter circuit.

As described above, in the clock-signal phase difference correction circuit 500 of the embodiment, in order to correct the phase difference between the clock signal CLY and the inverted-phase clock signal $CLY_{INV}$, input signals are positively fed back in the bistable circuit 502 by wiring the clock signal lines, and furthermore a multiple stages of inverters are connected in order to compensate the driving capability in accordance with the capacitance and driving frequencies of the clock signal lines.

Figure 5:
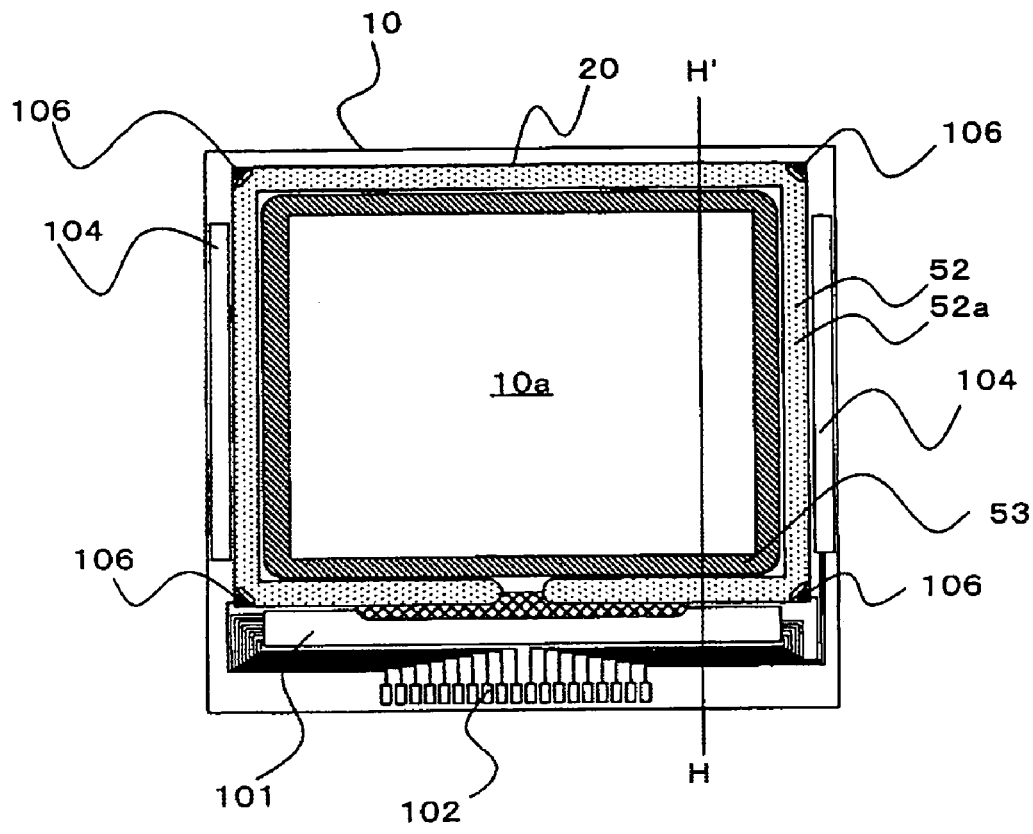
FIG. 5 is a plan view illustrating the overall configuration of the electro-optical apparatus in a first embodiment.
Figure 6:
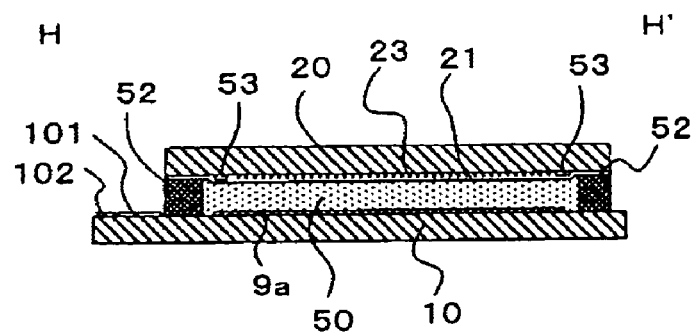
FIG. 6 is a cross-sectional view taken on H-H' of FIG. 5.

Next, a description will be given of the overall configuration of the electro-optical apparatus according to the embodiment with reference to FIGS. 5 and 6. Here, FIG. 5 is a plan view illustrating the overall configuration of an electro-optical apparatus according to the present embodiment. FIG. 6 is a cross-sectional view taken on H-H' of FIG. 5. Here, a TFT active matrix driving method liquid-crystal device of a drive circuit built-in type, which is an example of an electro-optical apparatus, will be taken for example.

In FIGS. 5 and 6, in the electro-optical apparatus according to the embodiment, a TFT array substrate 10 and a counter substrate 20 are disposed by being opposed to each other. A liquid-crystal layer 50 is enclosed between the TFT array substrate 10 and the counter substrate 20. The TFT array substrate 10 and the opposing substrate 20 are adhered to each other by a sealing material 52 provided in a sealing area 52a located in the surrounding area of an image-display area 10a.

The sealing material 52 can include, for example, a photo-curing resin, a thermosetting resin, or the like for bonding both of the substrates. After applied on the TFT array substrate 10 in the manufacturing process, the searing material is cured by ultraviolet irradiation, heating, or the like. Also, gap materials, such as glass fibers, glass beads, or the like are scattered in the sealing material 52 in order to keep the distance (gap between the substrates) between the TFT array substrate 10 and the counter substrate 20 a predetermined value. However, in place of or in addition to the scattering the materials in the sealing material 52, the gap materials may be scattered in the liquid-crystal layer 50 in the case of a large-size electro-optical apparatus in particular.

A frame light-shielding film 53, which defines the frame area of the image-display area 10a and shields the light, is provided on the counter substrate 20 side in parallel with the inside of the sealing area 52a on which the sealing material is disposed. However, a part or all of the frame light-shielding film 53 like this may be provided on the TFT array substrate 10 side as a built-in shielding film.

In the embodiment, the surrounding area is defined on the surroundings of the image-display area 10a. That is to say, the area closer to the edge than the frame light-shielding film 53 inclusive of the frame light-shielding film 53 is defined as the surrounding area when viewed from the center of the TFT array substrate 10.

A data-line drive circuit 101 and an external circuit connection terminal 102, which drive the data lines by supplying image signals to the data lines at a predetermined timing, are provided along one side of the TFT array substrate 10 (that is to say, the lower side in FIG. 5) in the outer area of the sealing area 52a in the surrounding area. Scanning-line drive circuits 104, which drive the scanning lines by supplying scanning signals to the scanning lines at a predetermined timing, are provided along the two sides (that is to say, both the right and the left sides in FIG. 5) adjacent to that one side. In this regard, a detailed description will be given below of the circuit configuration and the operation thereof on this TFT array substrate 10.

Also, upper-and-lower conductive materials 106 are disposed on the four corners of the counter substrate 20. On the other side, upper-and-lower conductive terminals are provided in the areas opposing to these four corners on the TFT array substrate 10. As a result, an electrical connection can be made between the TFT array substrate 10 and the opposing substrate 20.

In FIG. 6, an alignment layer is formed on pixel electrodes 9a, on which pixel switching TFT and wiring lines such as the scanning lines, the data lines, and the like have been formed. On the other hand, on the counter substrate 20, a grid or stripe light-shielding film 23 and furthermore an alignment layer on the uppermost layer are formed in addition to a counter electrode 21. The liquid crystal layer 50 includes liquid-crystal of one kind or several kinds of nematic liquid-crystals. The liquid-crystal layer 50 goes into a predetermined alignment state between this pair of alignment layers.

In this regard, on the TFT array substrate 10 shown in FIGS. 5 and 6, in addition to these data-line drive circuit 101, scanning-line drive circuit 104, and the like, a sampling circuit which samples image signals on the image-signal lines to supply the signals to the data lines, a precharge circuit which individually supplies predetermined voltage-level precharge signals to a plurality of data lines in advance of the image signals, a checking circuit which checks the quality, defects, and the like of the electro-optical apparatus during production or at shipping time may be formed.

Figure 7:
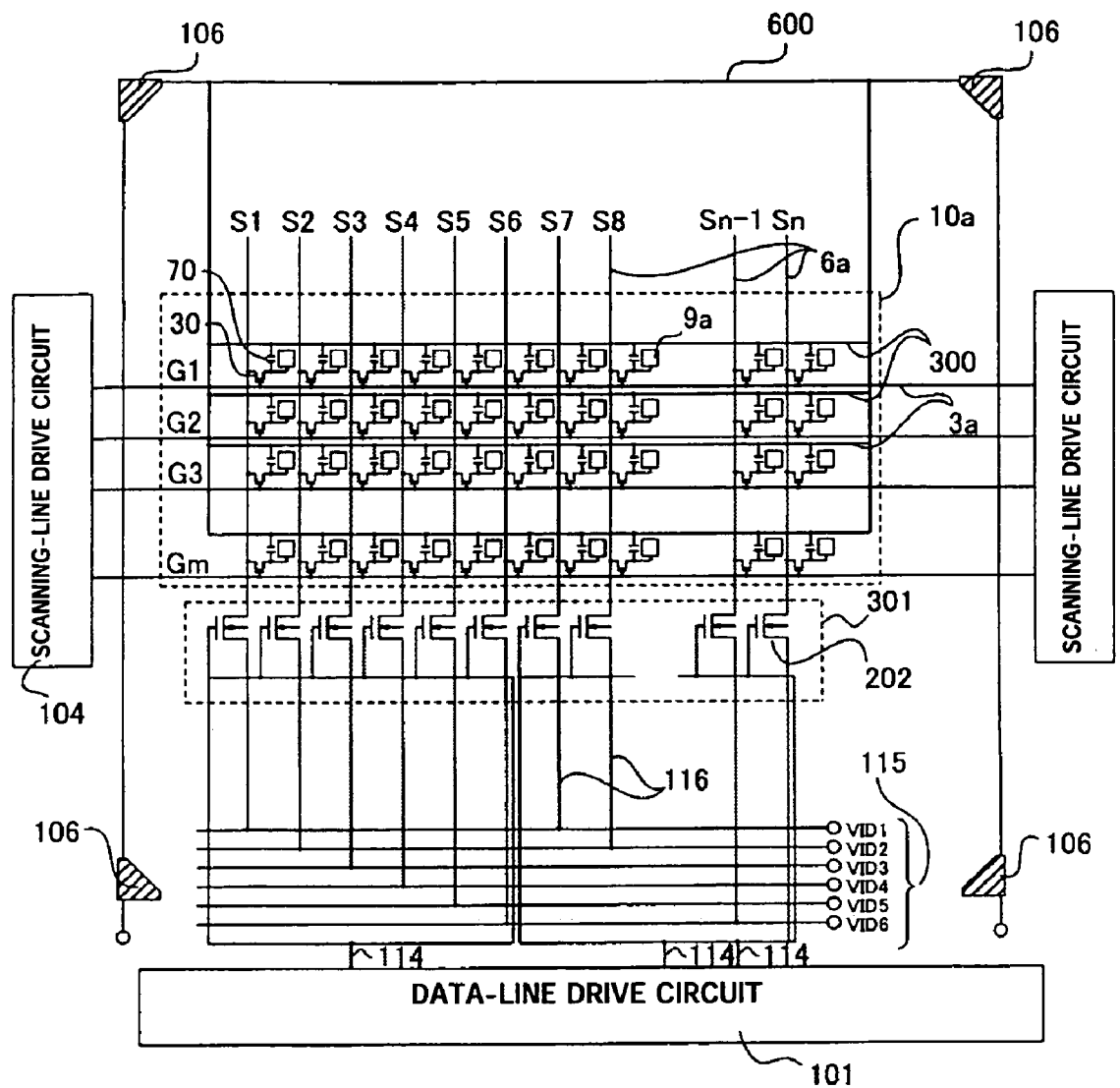
FIG. 7 is an equivalent circuit of various elements, wiring lines and the like in a plurality of pixels formed in a matrix, which constitute the image-display area of the electro-optical apparatus.
Figure 7:
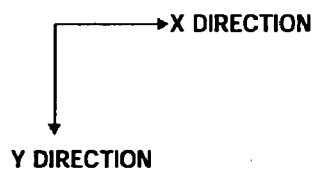

Next, a description will be given of the configuration within the image-display area 10a of the electro-optical apparatus according to the first embodiment with reference to FIG. 7. FIG. 7 is an equivalent circuit of various elements, wiring lines and the like in a plurality of pixels formed in a matrix, which constitute an image-display area 10a of the electro-optical apparatus.

In FIG. 7, pixel electrodes 9a and TFTs 30 for controlling the switching of the pixel electrodes 9a are individually formed in a plurality of the pixel parts formed in a matrix in the image-display area 10a (refer to FIG. 5) of the electro-optical apparatus according to the present embodiment. Data lines 6a, to which image signals are supplied, are electrically connected to the sources of the relevant TFTs 30. The image signals S1, S2, . . . , Sn to be written on the data lines 6a may be sequentially supplied in this order. However, in this embodiment, in particular, the image signals S1, S2, . . . , Sn are serial-parallel expanded into N pieces of parallel image signals, and supplied from N pieces of image-signal lines 115 to N pieces of adjacent data lines 6a together for each group.

In the surrounding area, which is outside the image-display area, one end (the lower end in FIG. 7) of the data line 6a is connected to a TFT 202 as an example of a switching circuit element constituting a sampling circuit 301. For this switching circuit element, an n-channel TFT 202 may be used as shown in the figure, or a p-channel TFT may be used. Also, a complementary TFT or the like can be used. In this case, the lower end of the data line 6a in FIG. 7 is connected to the drain of this TFT 202 through a wiring line, the image-signal line 115 is connected to the source of the TFT 202 through a wiring line 116, and a sampling circuit driving signal line 114 connected to the data-line drive circuit 101 is connected to the gate of this TFT 202.

The image signals S1, S2, . . . , Sn on the image-signal lines 115 are sampled by the sampling circuit 301 in accordance with the sampling signals supplied from the data-line drive circuit 101 through the sampling circuit driving signal lines 114, and are supplied to each data line 6a.

As described above, the image signals S1, S2, . . . , Sn to be written on the data lines 6a may be sequentially supplied in this order, or may be supplied to a plurality of the adjacent data lines 6a together for each group. In this embodiment, as shown in FIG. 7, six pieces of data lines 6a make one set, and image signals are supplied to this set at once.

Also, scanning lines 3a are electrically connected to the gates of the TFTs 30, and scanning signals G1, G2, . . . , Gm are line-sequentially applied to the scanning lines 3a in pulse manner in this order at a predetermined timing. The pixel electrodes 9a are electrically connected to the drains of the TFTs 30. By closing the switches of the TFTs 30, which are switching elements, for a certain period, the image signals S1, S2, . . . , Sn supplied from the data lines 6a are written at a predetermined timing.

The predetermined level image signals S1, S2, . . . , Sn, which have been written into the liquid crystal, an example of an electro-optical material, through the pixel electrodes 9a are retained for a certain period between the liquid crystal and the counter electrodes formed on the counter substrate. The liquid crystal modulates light by changing the orientation and the order of the molecular association in accordance with the applied voltage level, thereby making it possible to display gray scale. In a normally white mode, the transmittance ratio of incident light decreases in accordance with the applied voltage for each pixel. In a normally black mode, the transmittance ratio of incident light increases in accordance with the applied voltage for each pixel. As a whole, the electro-optical apparatus emits light having a contrast in accordance with image signals.

In order to prevent the image signal retained here from leaking, a storage capacitor 70 is added in parallel with the liquid-crystal capacitor formed between the pixel electrode 9a and the counter electrode 21 (refer to FIGS. 5 and 6). This storage capacitor 70 can be provided in line with the scanning line 3a, and includes a fixed voltage side capacitor electrode and a capacitor line 300 kept at a predetermined potential. By this storage capacitor 70, the charge retention characteristic in each pixel electrode is improved. In this regard, the potential of the capacitor line 300 may be always fixed at one voltage value, or may be fixed while being swung among a plurality of voltage values in a predetermined cycle.

On the TFT array substrate 10, a counter electrode potential line 600 is wired so as to be connected to the upper-and-lower conductive terminals to which the upper-and-lower conductive materials 106 described above are joined, and pass through the four corners of the TFT array substrate 10. Here, a predetermined potential is supplied to the counter electrode 21 through the upper-and-lower conductive materials 106 and the counter electrode potential line 600. By the supply of this potential, it is possible to drive the liquid crystal held between the pixel electrode 9a and the counter electrode 21, as described above.

Next, a description will be given of the circuit layout of the clock-signal phase difference correction circuit 500 and the various wiring lines connected to this circuit on the TFT array substrate 10 with reference to FIG. 8. In this regard, in the following, when a description is given about the scanning-line drive circuit 104 shown in FIGS. 5 and 7, the circuit is denoted by adding a code, for example, a scanning-line drive circuit 104R which is located on the right side of FIG. 8 as viewed in plan, and a scanning-line drive circuit 104L which is located on the left side.

Figure 8:
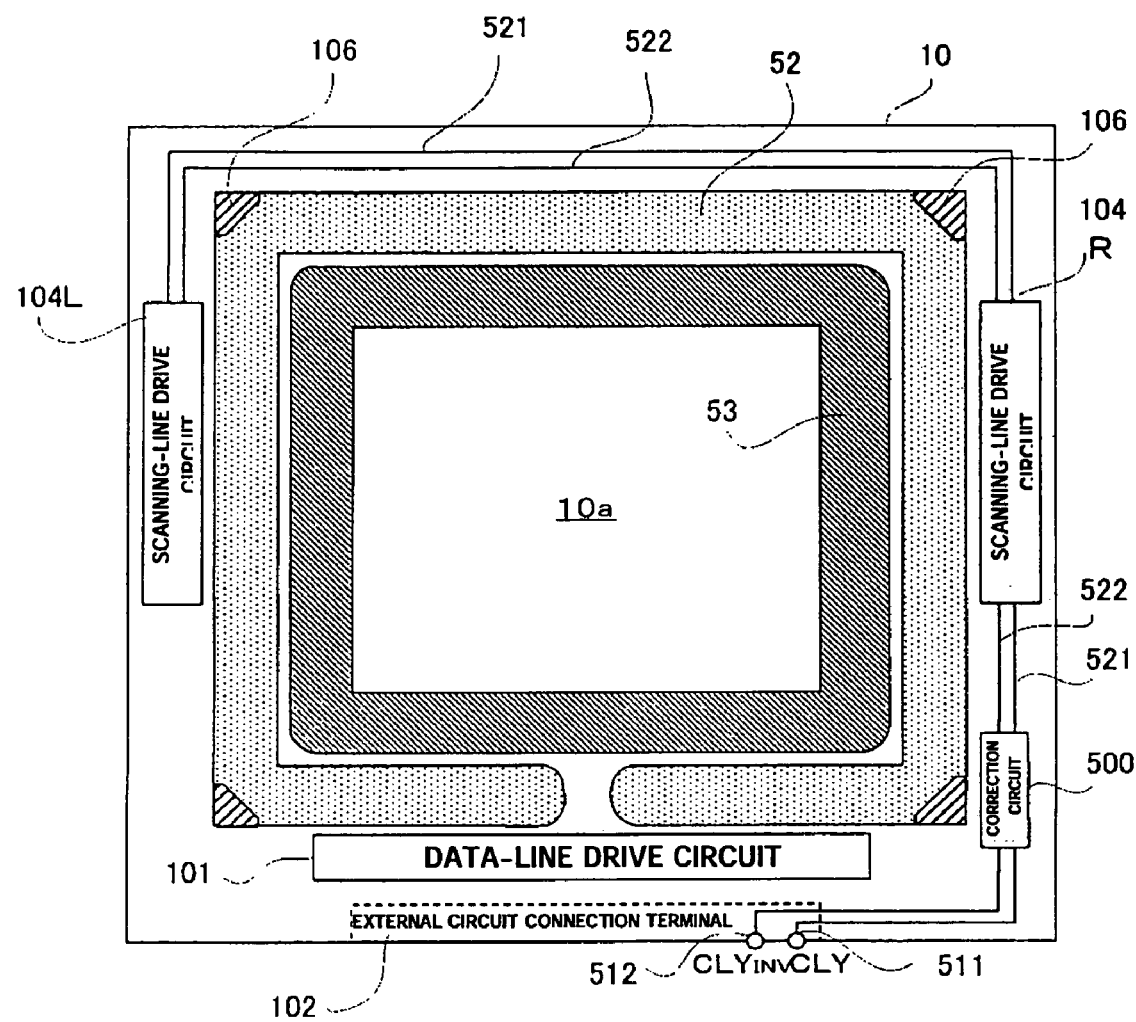
FIG. 8 is a plan view illustrating the disposition configuration of the clock-signal phase difference correction circuit and the connection method of various wiring lines in the first embodiment.

As shown in FIG. 8, the external circuit connection terminal 102 disposed in the surrounding area includes a clock-signal terminal 511 which inputs the clock signal CLY and an inverted-phase clock signal terminal 512 which inputs the inverted-phase clock signal $CLY_{INV}$, respectively, from the external circuit (not shown) into the TFT array substrate 10. The clock-signal terminal 511 and the inverted-phase clock signal terminal 512 are disposed close to each other. In this regard, the external circuit connection terminal 102 can include other terminals together with the clock-signal terminal 511 and the inverted-phase clock signal terminal 512. However, description of the other terminals is omitted.

In the embodiment, as shown in FIG. 8, the clock-signal phase difference correction circuit 500 is disposed at the lower right position on the plane of FIG. 8 in the surrounding area, that is to say, at the position between the scanning-line drive circuit 104R, which is an example of a first drive circuit according to the invention, and the clock-signal terminal 511 and the inverted-phase clock signal terminal 512. Also, the clock-signal phase difference correction circuit 500 is electrically connected to the clock-signal terminal 511 through a clock-signal line 521, which is an example of a first signal line according to the invention. Also, the clock-signal phase difference correction circuit 500 is electrically connected to the inverted-phase clock signal terminal 512 through an inverted-phase clock signal line 522, which is an example of a second signal line according to the invention. With such connections, the clock signal CLY and the inverted-phase clock signal $CLY_{INV}$ are input into the clock-signal phase difference correction circuit 500.

Here, the clock-signal terminal 511 and the inverted-phase clock signal terminal 512 are preferably located as terminals disposed near the right end on the plane of FIG. 8 among a plurality of terminals included in the external circuit connection terminal 102. With this arrangement, the wiring line distances of the clock-signal line 521 and the inverted-phase clock signal line 522 from the clock-signal terminal 511 and the inverted-phase clock signal terminal 512 to the clock-signal phase difference correction circuit 500 can be more shortened, thereby the signal delay or the like due to the wiring line distance is prevented. In this regard, in the external circuit connection terminal 102, the clock-signal terminal 511 and the inverted-phase clock signal terminal 512 may be disposed at the opposite position with each other. In this case, the clock-signal line 521 is wired inside the inverted-phase clock signal line 522, that is to say, at the image-display area 10a side, closely along the clock-signal line 521.

Next, the clock-signal phase difference correction circuit 500 is electrically connected to the scanning-line drive circuit 104R through the clock-signal line 521 and the inverted-phase clock signal line 522.

Subsequently, the clock-signal line 521 and the inverted-phase clock signal line 522 output from the scanning-line drive circuit 104R are wired in the area which opposes the external circuit connection terminal 102 across the image-display area 10a in the surrounding area and is outside the sealing area 52a, and is electrically connected to the scanning-line drive circuit 104L, which is disposed at the left side on the plane of FIG. 8, and is an example of a second drive circuit according to the invention.

With the connections as described above, the clock signal CLY and the inverted-phase clock signal $CLY_{INV}$ having a phase difference corrected with each other by the clock-signal phase difference correction circuit 500 are input into the scanning-line drive circuit 104R and the scanning-line drive circuit 104L.

Figure 9:
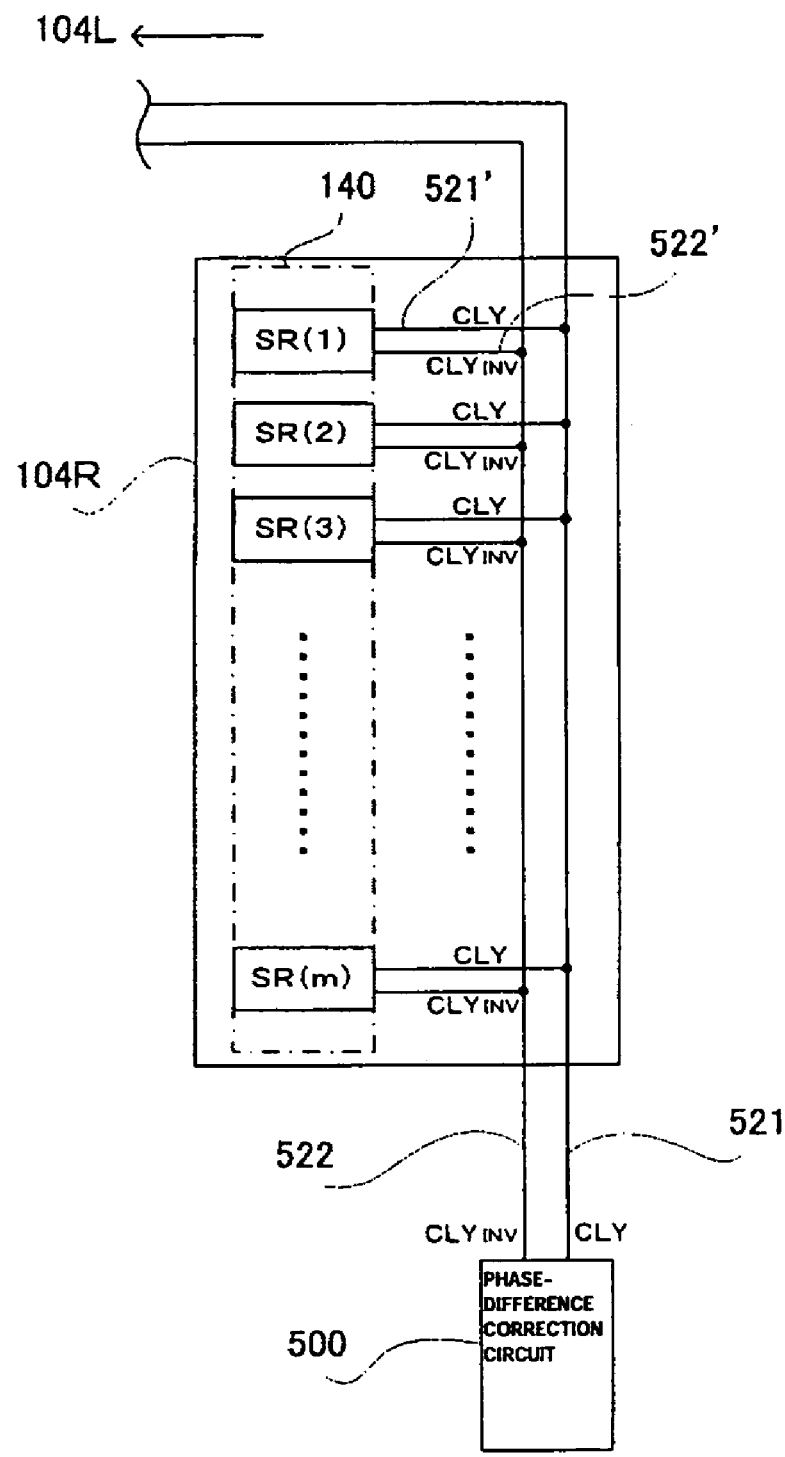
FIG. 9 is an exemplary block circuit diagram illustrating the method of wiring line connection between a scanning-line drive circuit 104R and a clock-signal phase difference correction circuit 500 in the first embodiment.
Figure 10:
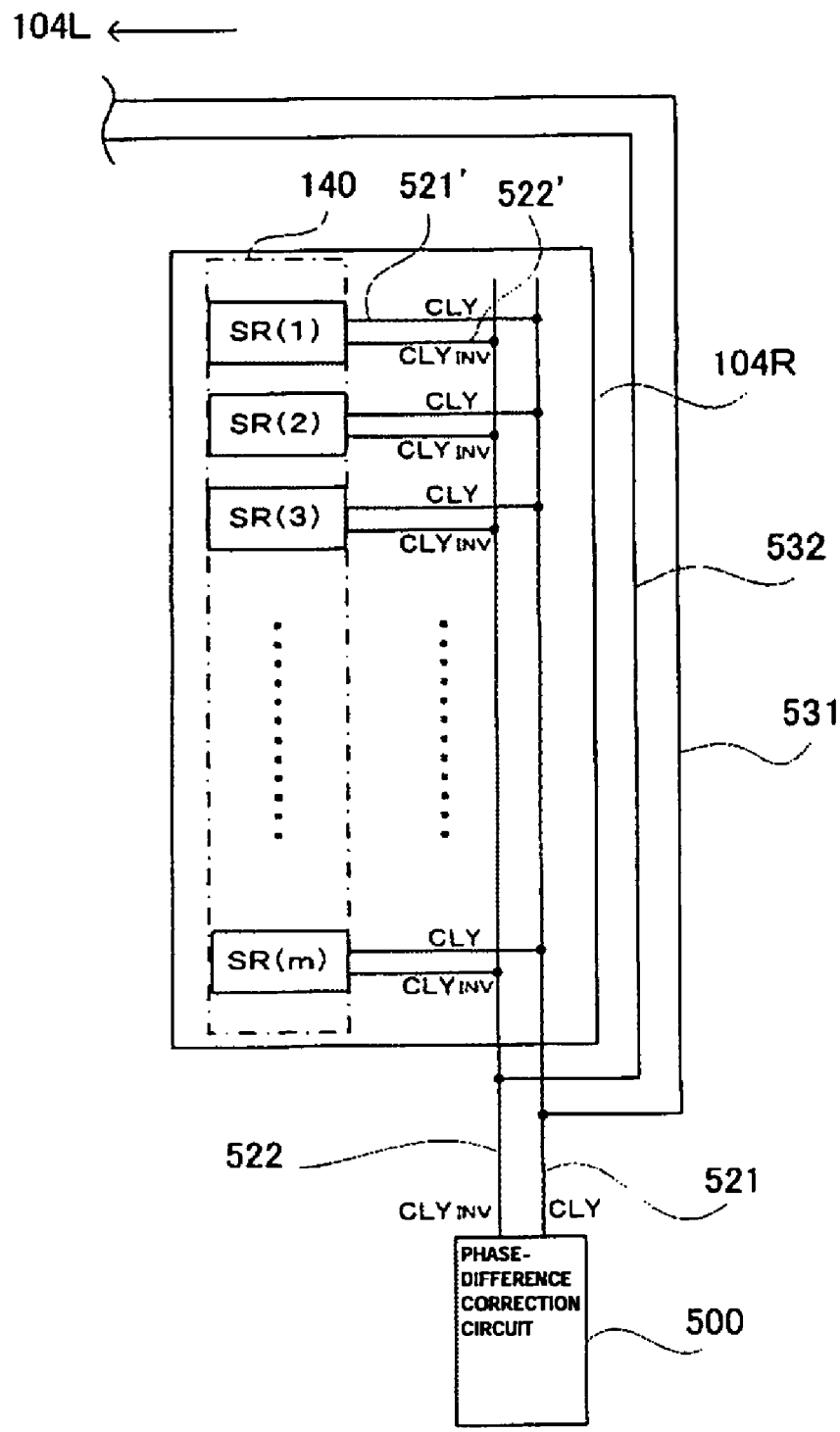
FIG. 10 is an exemplary block circuit diagram illustrating a comparison example with FIG. 9.

Here, with reference to FIGS. 9 and 10, a more specific description will be given of the detailed configuration of the scanning-line drive circuit 104R and a wiring line connection method of the clock-signal phase difference correction circuit 500 and the scanning-line drive circuit 104R. Here, FIG. 9 is an exemplary block circuit diagram illustrating the method of wiring line connection between the scanning-line drive circuit 104R and the clock-signal phase difference correction circuit 500 according to the embodiment. FIG. 10 is an exemplary block circuit diagram illustrating a comparison example with FIG. 9. In this regard, in FIGS. 9 and 10, the components other than the scanning-line drive circuit 104R and the clock-signal phase difference correction circuit 500 shown in FIG. 8 are omitted in the figure.

As shown in FIG. 9, in the present embodiment, the scanning-line drive circuit 104R can include a shift register 140. The scanning signals G1, G2, . . . , Gm supplied to the scanning lines 3a are sequentially output from respective stages SR (i) (i=0, 1, 2, 3, . . . , m) of the shift register 140. More specifically, each stage SR (i) of the shift register 140 includes a gate device, such as a clocked inverter or a transfer gate. By alternately inputting the clock signal CLY and the inverted-phase clock signal $CLY_{INV}$ each stage, the scanning signals G1, G2, . . . , Gm for the scanning lines 3a are sequentially transferred at the timing in synchronization with a half cycle of the clock signal CLY.

At the same time, the clock-signal line 521 and the inverted-phase clock signal line 522, which are electrically connected to the output side of the clock-signal phase difference correction circuit 500 are wired so as to pass through the scanning-line drive circuit 104R, and subsequently reaches the scanning-line drive circuit 104L (refer to FIG. 8), which is located on the opposite side across the image-display area 10a. In the embodiment, as shown in FIG. 9, the clock-signal line 521 is connected to the respective stages SR (i) of the shift register 140 through a wiring line 521', while the inverted-phase clock signal line 522 is similarly connected to the respective stages SR (i) of the shift register 140 through a wiring line 522'. With such connections, the clock signal CLY and the inverted-phase clock signal $CLY_{INV}$ having a phase difference corrected with each other by the clock-signal phase difference correction circuit 500 are input into the respective stages SR (i) of the shift register 140, and thus the scanning-line drive circuit 104R can output good scanning signals without causing an erroneous operation. In this regard, the connection relationship between the clock-signal line 521 and the inverted-phase clock signal line 522, and the respective stages SR (i) of the shift register 140 is similarly applied to the scanning-line drive circuit 104L disposed at the left side on the plane of FIG. 8.

Here, in the embodiment, in particular, as shown in FIG. 9, the clock-signal line 521 and the inverted-phase clock signal line 522 output from the clock-signal phase difference correction circuit 500 are wired to be input into the scanning-line drive circuit 104R without branching, and subsequently are wired to the scanning-line drive circuit 104L without branching after passing through the scanning-line drive circuit 104R.

As opposed to this, in the case of a comparison example shown in FIG. 10, the clock-signal line 521 and the inverted-phase clock signal line 522 branch at the preceding stage of the scanning-line drive circuit 104R, and the branched clock-signal line 531 and inverted-phase clock signal line 532 are furthermore wired to the scanning-line drive circuit 104L. In the case of this comparison example, in order to provide the wiring lines additionally necessary for the scanning-line drive circuit 104L, that is to say, the wiring lines of the clock-signal line 531 and the inverted-phase clock signal line 532, additional space needs to be secured on the TFT array substrate 10 by widening the periphery of the TFT array substrate 10.

As is apparent from the comparison with the comparison example with reference to FIGS. 9 and 10, in the embodiment, by adopting the relatively simple wiring configuration without branching the clock-signal line 521 and the inverted-phase clock signal line 522, it becomes possible to miniaturize the TFT array substrate 10 and thus the entire apparatus.

To summarize the above, in the embodiment, the clock-signal line 521 and the inverted-phase clock signal line 522 electrically connect the section between the clock-signal terminal 511 and the inverted-phase clock signal terminal 512, and the clock-signal phase difference correction circuit 500, the section between the clock-signal phase difference correction circuit 500 and the scanning-line drive circuit 104R, and the section between the scanning-line drive circuit 104R and the scanning-line drive circuit 104L without branching. With such connections, the clock signal CLY and the inverted-phase clock signal $CLY_{INV}$ having a phase difference corrected with each other can be supplied from the clock-signal phase difference correction circuit 500 to both the scanning-line drive circuit 104R and the scanning-line drive circuit 104L. Accordingly, with a minimum pieces of the clock-signal phase difference correction circuits, good operation of the drive circuit is possible, and, at the same time, the miniaturization of the entire apparatus becomes possible.

Figure 11:
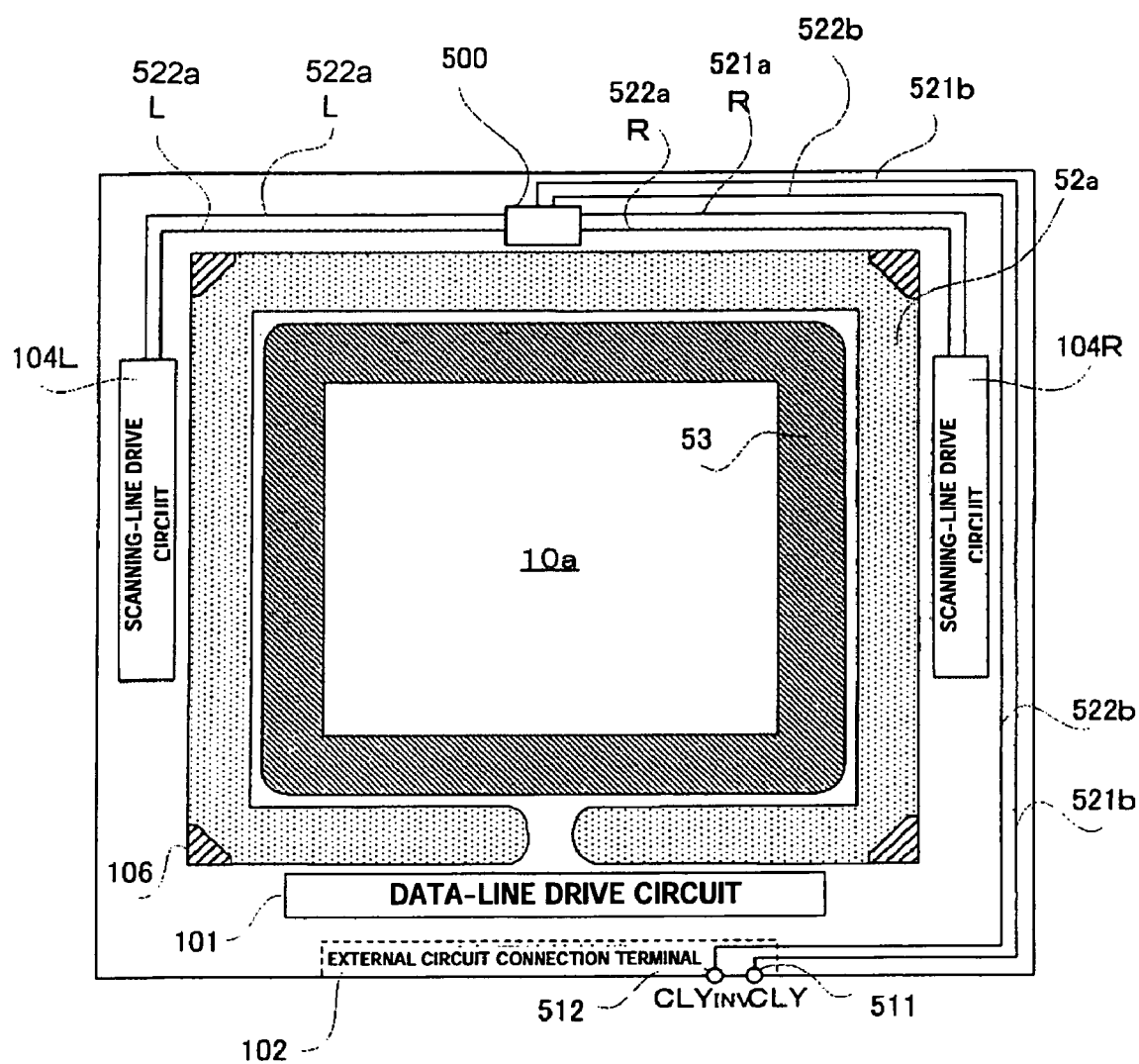
FIG. 11 is a plan view illustrating the disposition configuration of a clock-signal phase difference correction circuit and the connection method of various wiring lines in a second embodiment.

A description will be given of an electro-optical apparatus according to a second embodiment of the invention with reference to FIG. 11. Here, FIG. 11 is shown as a figure having the same purpose as FIG. 8. FIG. 11 is a plan view illustrating the disposition configuration of a clock-signal phase difference correction circuit 500 and the connection method of various wiring lines in the electro-optical apparatus according to the second embodiment.

As compared with the first embodiment described above, the second embodiment is different in the method of disposing the phase-difference correction circuit on the substrate plane. The other circuit configuration in the image-display area and the operation thereof, and the entire configuration of the electro-optical apparatus are the same as those of the first embodiment. In the following, therefore, a description will be given of the configuration different from that of the first embodiment. Also, the same reference numerals are given to the same components as those of the first embodiment shown in FIGS. 1 to 8, and their description is omitted. In this regard, in the following, for the clock-signal line 521 and the inverted-phase clock signal line 522 described in the first embodiment, the lines are denoted by adding "b" to the input side, and by adding "a" to the output side of the clock-signal phase difference correction circuit 500. Specifically, for example, for the input side, the line is referred to as a "clock-signal line 521b". Furthermore, at the output side of the clock-signal phase difference correction circuit 500, the line connected to the scanning-line drive circuit 104R is denoted by adding a code of "R", and the line connected to the scanning-line drive circuit 104L is denoted by adding a code of "L". Specifically, for example, a description will be given by referring to as a "clock-signal line 521aR" or a "clock-signal line 521aL".

As shown in FIG. 11, in the embodiment, the clock-signal phase difference correction circuit 500 is disposed at the position which is opposed to the external circuit connection terminal 102 across the image-display area 10a in the area outer than the sealing area 52a and on the center line dividing the width of the image-display area 10a in an X direction in two. As shown in FIG. 11, the clock-signal phase difference correction circuit 500 is electrically connected to the clock-signal terminal 511 through a clock-signal line 521b which is wired along the periphery of the TFT array substrate 10 in the area outer than the sealing area 52a. Also, the clock-signal phase difference correction circuit 500 is electrically connected to the inverted-phase clock signal terminal 512 through an inverted-phase clock signal line 522b which is wired closely along the clock-signal line 521b inside the clock-signal line 521b.

In this regard, as in the case of the first embodiment, in the external circuit connection terminal 102, the clock-signal terminal 511 and the inverted-phase clock signal terminal 512 may be disposed at the opposite positions with each other. In this case, the clock-signal line 521b is wired inside the inverted-phase clock signal line 522b, that is to say, at the image-display area 10a side, closely along the clock-signal line 521b.

With this connection, the clock signal CLY and the inverted-phase clock signal $CLY_{INV}$ are input into the clock-signal phase difference correction circuit 500.

Next, the clock-signal phase difference correction circuit 500 is electrically connected to the scanning-line drive circuit 104R, disposed on the right side in FIG. 11, through the clock-signal line 521aR and the inverted-phase clock signal line 522aR. At the same time, the clock-signal phase difference correction circuit 500 is electrically connected to the scanning-line drive circuit 104L, disposed on the left side in FIG. 11, through the clock-signal line 521aL and the inverted-phase clock signal line 522aL. With this connection, the clock signal CLY and the inverted-phase clock signal $CLY_{INV}$ having a phase difference corrected with each other by the above-described operation of the clock-signal phase-difference correction circuit 500 are input into the scanning-line drive circuit 104R and the scanning-line drive circuit 104L.

Here, in the present embodiment, the inverted-phase clock signal line 522aR is preferably disposed in the inner side of the clock-signal line 521aR, that is to say, at the image-display area 10a side, closely along the clock-signal line 521aR. With this disposition, in the upper right area on the TFT array substrate 10 shown in FIG. 11, four signal lines are closely wired in parallel to each other, in the order of the clock-signal line 521b, the inverted-phase clock signal line 522b, the clock-signal line 521aR, and the inverted-phase clock signal line 522aR, from the periphery side of the TFT array substrate 10 in the direction of the image-display area 10a. In other words, in the above-described area, the clock-signal line and the inverted-phase clock signal line are alternately disposed in parallel with each other. Accordingly, the clock-signal line 521aR and the inverted-phase clock signal line 522b, which are close to each other, cancel the noises that occur from the two lines with each other. As a result, it becomes possible, for example, to prevent the operation troubles of the scanning-line drive circuit 104R caused by the amplification of the noise that occurs when the inverted-phase clock signal lines are disposed close to each other. In this regard, as described above, when the clock-signal line 521b and the inverted-phase clock signal line 522b are disposed in the opposite positions with each other, for the signal wiring after the output of the clock-signal phase difference correction circuit 500, it goes without saying that the trouble due to the noise of the signal wiring can be prevented by disposing the wiring lines in the opposite positions, as compared with the disposition shown in FIG. 11.

With the arrangement as described above, the wiring line distance from the clock-signal phase difference correction circuit 500 to the scanning-line drive circuit 104R and the wiring line distance from the clock-signal phase difference correction circuit 500 to the scanning-line drive circuit 104L become equal, and thus the wiring time constants of both wiring lines become equal. By this, for example, even if signal delays occur from the clock-signal phase difference correction circuit 500 to the scanning-line drive circuit 104R and the scanning-line drive circuit 104L to an unignorable extent, the individual signal delays till the right and left scanning-line drive circuits are equal, and thus it becomes possible to prevent the trouble of the occurrence of the difference in the driving timing between the right and left scanning-line drive circuits due to the signal delays.

Accordingly, in the electro-optical apparatus according to the embodiment, the erroneous operation of the scanning-line drive circuit caused by the difference in the phases of the clock-signal and the inverted-phase clock signal is prevented. At the time, the difference of the timing between the right and the left scanning-line drive circuits is prevented, and thus normal image display becomes possible.

Figure 12:
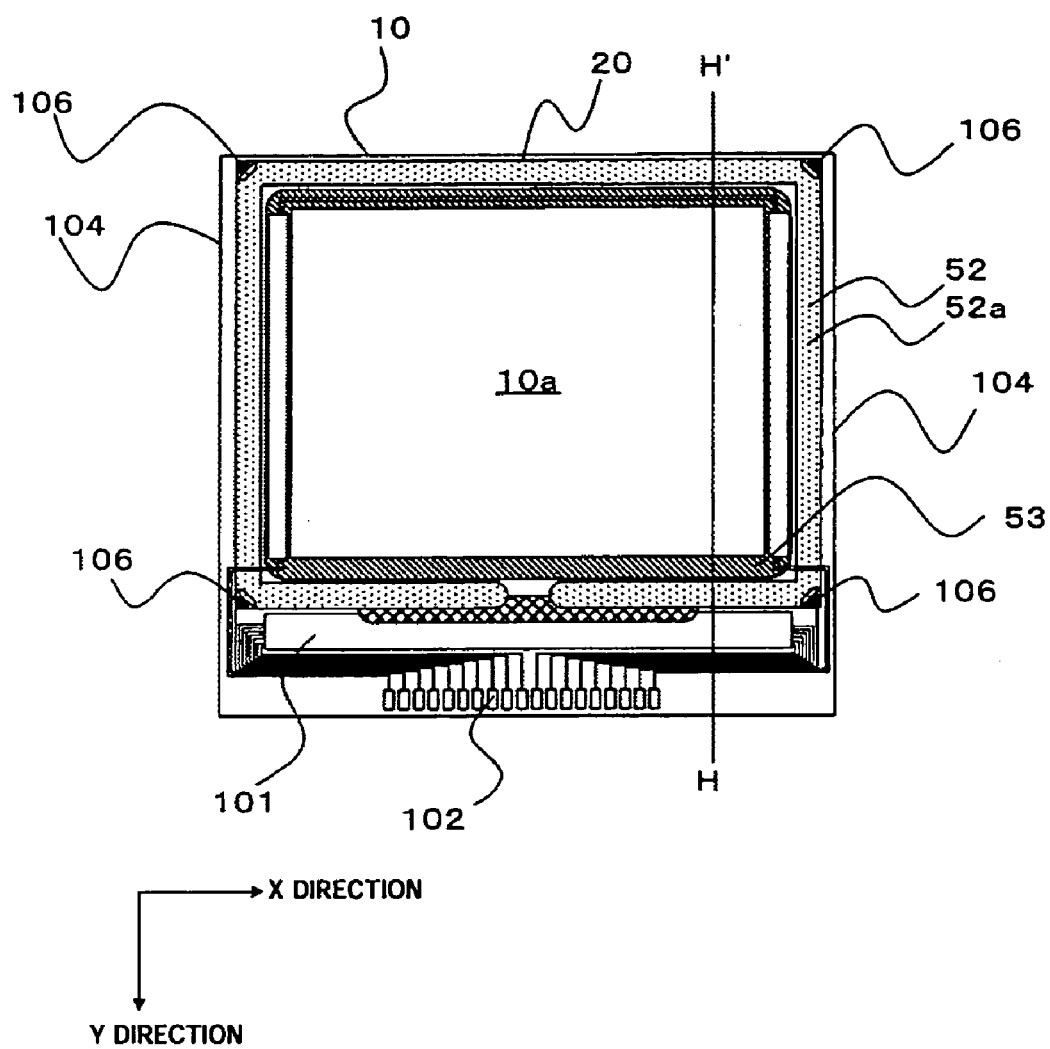
FIG. 12 is a plan view illustrating the overall configuration of an electro-optical apparatus in a third embodiment.
Figure 13:
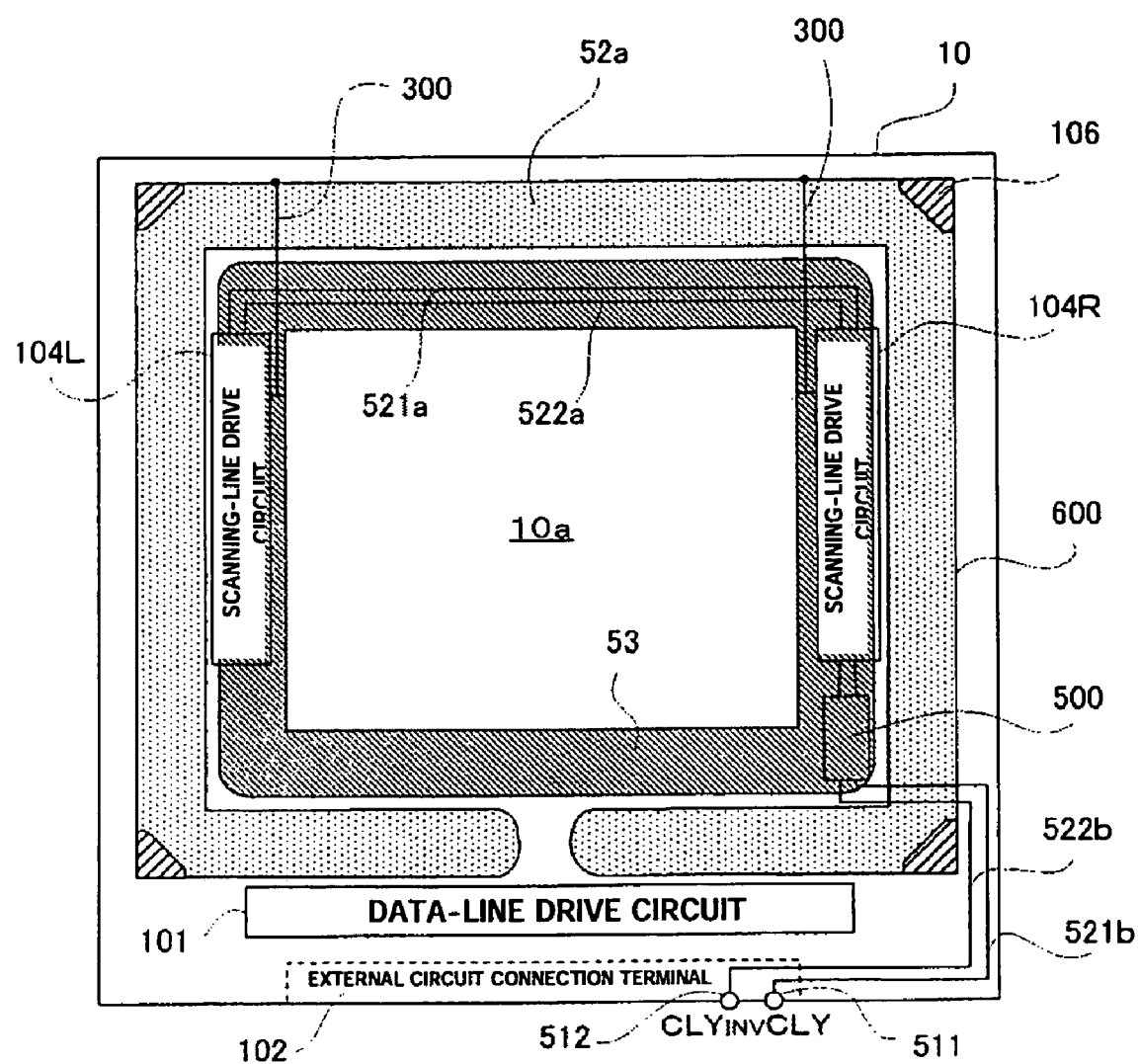
FIG. 13 is a plan view illustrating the disposition configuration of the clock-signal phase difference correction circuit and the connection method of various wiring lines in the third embodiment.

A description will be given of an electro-optical apparatus according to a third embodiment of the invention with reference to FIGS. 12 and 13. Here, FIG. 12 is a diagram illustrating the overall configuration of the electro-optical apparatus according to the present embodiment as a diagram having the same purpose as FIG. 5. FIG. 13 is a plan view illustrating the disposition configuration of the clock-signal phase difference correction circuit 500 and the connection method of the various wiring in the third embodiment as a diagram having the same purpose as FIG. 8.

As compared with the first embodiment and the second embodiment described above, the third embodiment is different in the method of disposing the scanning-line drive circuits, the phase-difference correction circuit, and the wiring method of the signal lines between the phase-difference correction circuit and the scanning-line drive circuits. The other circuit configuration in the image-display area and the operation thereof and the like are the same as those of the first embodiment or the second embodiment. In the following, therefore, a description will be given of the configuration different from that of the first embodiment or the second embodiment. In this regard, the same reference numerals are given to the same components as those of the first embodiment and the second embodiment shown in FIGS. 1 to 11, and their description is omitted.

As shown in FIG. 13, in the present embodiment, the scanning-line drive circuit 104R and the scanning-line drive circuit 104L are disposed in the area inner than the periphery of the sealing area 52a along the two sides which are opposed to each other on both the right and left sides of the image-display area 10a in the surrounding area of the image-display area 10a.

With this disposition, the area between the image-display area 10a and the sealing area 52a in the surrounding area, that is to say, a "dead space", where nothing is disposed in the first embodiment or the second embodiment so far, can be used for disposing the scanning-line drive circuit 104R and the scanning-line drive circuit 104L. Thus the miniaturization of the entire apparatus becomes possible.

Next, as shown in FIG. 13, the clock-signal terminal 511 and the inverted-phase clock signal terminal 512, the clock-signal phase difference correction circuit 500, and the scanning-line drive circuit 104R and the scanning-line drive circuit 104L are electrically connected to each other in the same relationship as in the first embodiment.

Here, in the present embodiment, in particular, as shown in FIG. 13, the clock-signal phase difference correction circuit 500 is disposed at the side inner than the periphery of the sealing area 52a. Furthermore, the clock-signal line 521a and the inverted-phase clock signal line 522a output from the scanning-line drive circuit 104R are wired in the area inner than the periphery of the sealing area 52a, in the area opposing to the external circuit connection terminal 102 across the image-display area 10a in the surrounding area, and are connected to the scanning-line drive circuit 104L disposed at the left side on the plane of FIG. 13. In other words, the clock-signal phase difference correction circuit 500, the clock-signal line 521a and the inverted-phase clock signal line 522a are disposed using a "dead space", where nothing is disposed in the first embodiment or the second embodiment so far, together with the scanning-line drive circuit 104R and the scanning-line drive circuit 104L described above. Accordingly, it is possible to further miniaturize the TFT array substrate 10 and the entire apparatus than in the first embodiment.

In this regard, as shown in FIG. 13, in the embodiment, there are sections on the substrate plane where the clock-signal line 521*a* and the inverted-phase clock signal line 522*a* intersect the above-described capacitor line 300 or the counter electrode potential line 600. However, in such sections, it is possible to construct a double layer structure in which the former is formed on one layer, and the latter is formed on another layer. At this time, if the both wiring lines are made of, for example, a low resistance metal film or alloy film including aluminum or the like, it is possible to prevent the signal delay of the wiring lines.

Also, in the present embodiment, the scanning-line drive circuit 104R, the scanning-line drive circuit 104L, the clock-signal phase difference correction circuit 500, the clock-signal line 521*a*, and the inverted-phase clock signal line 522*a* may be disposed so as to overlap a part of the sealing area 52*a*, inside the periphery of the sealing area 52*a*. Alternatively, these may be disposed so as to be completely covered with the frame light-shielding film 53. In any case, it is not necessary to secure a relatively large area for them in the outer area than the periphery of the sealing area 52*a*, and thus the miniaturization of the entire apparatus is possible.

As described above, in the electro-optical apparatus according to the embodiment, the clock-signal phase difference correction circuit 500 can prevent the erroneous operations of the scanning-line drive circuit 104R and the scanning-line drive circuit 104L, and the entire apparatus can be further miniaturized.

Here, a description will be given of a variation of the third embodiment with reference to FIG. 14. Here, FIG. 14 is a plan view illustrating the disposition configuration of the clock-signal phase difference correction circuit 500 and the connection method of the various wiring in the variation of the third embodiment as a diagram having the same purpose as FIG. 8.

Figure 14:
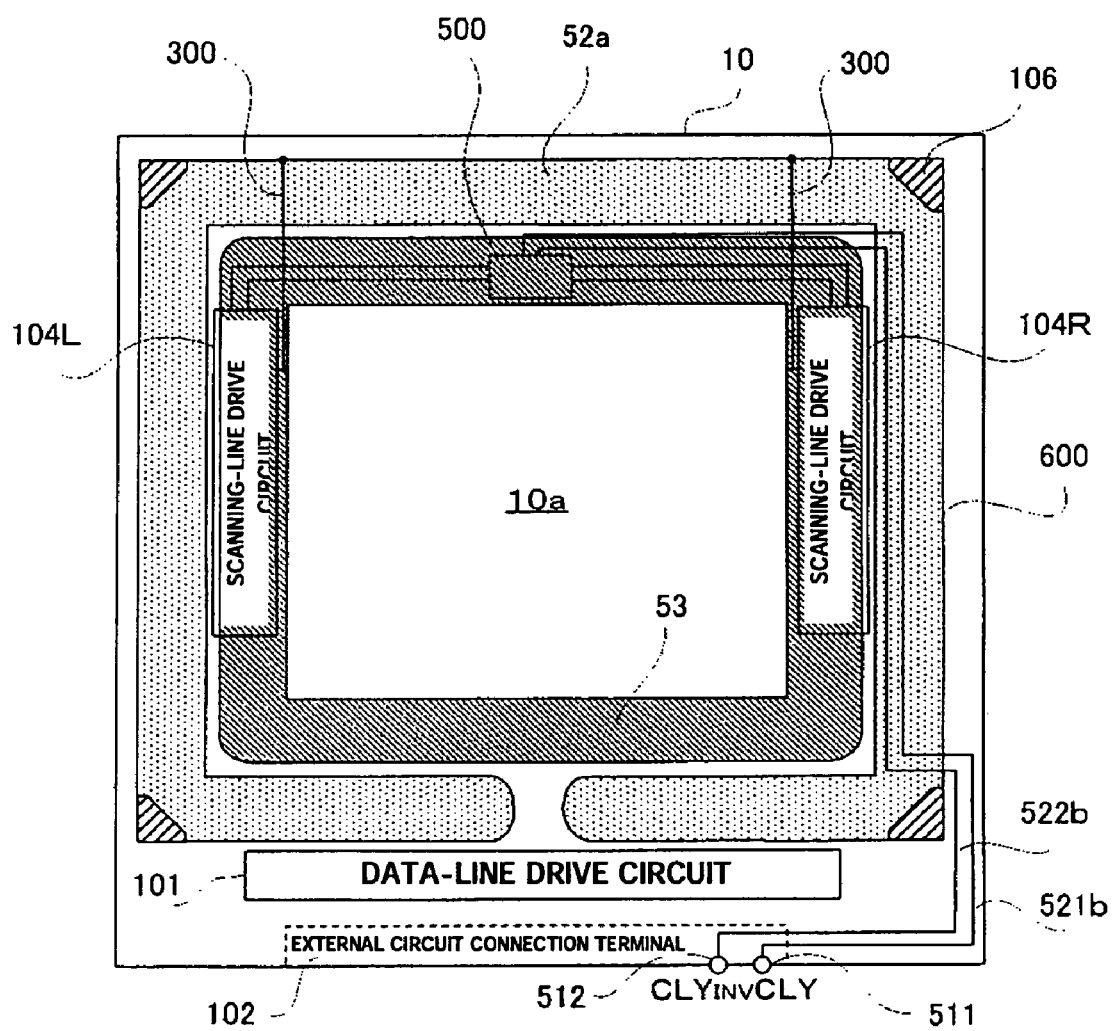
FIG. 14 is a plan view illustrating the disposition configuration of a clock-signal phase difference correction circuit and the connection method of various wiring lines in a variation of the third embodiment.

As shown in FIG. 14, in this variation, in the same manner as the third embodiment described above, the clock-signal phase difference correction circuit 500 is disposed at the inner side than the periphery of the sealing area 52*a*. At the same time, as in the second embodiment described above, the clock-signal phase difference correction circuit 500 is disposed at the position which is opposed to the external circuit connection terminal 102 across the image-display area 10*a* and on the center line dividing the width of the image-display area 10*a* in an X direction in two. At this time, the electrical connection relationship among both of the right and left scanning-line drive circuits 104, the clock-signal line 521*a*, the inverted-phase clock signal line 522*a*, and the clock-signal phase difference correction circuit 500 is the same as in the second embodiment described above.

With the arrangement, the wiring line distance from the clock-signal phase difference correction circuit 500 to the scanning-line drive circuit 104R and the wiring line distance from clock-signal phase difference correction circuit 500 to the scanning-line drive circuit 104L become equal, and thus the wiring time constants of both wiring lines become equal. Thus, for example, even if signal delays occur from the clock-signal phase difference correction circuit 500 to the scanning-line drive circuit 104R and the scanning-line drive circuit 104L, the individual signal delays till the right and left scanning-line drive circuits are equal, and thus it becomes possible to prevent the trouble of the occurrence of the difference in the driving timing between the right and the left scanning-line drive circuits due to the signal delays. Furthermore, it is possible to reduce the space of the area outer than the periphery of the sealing area 52*a*, which is provided for the clock-signal phase difference correction circuit 500 in the second embodiment, and thus further miniaturization of the entire apparatus becomes possible.

In this regard, also in this variation, both of the right and left scanning-line drive circuits 104, the clock-signal line 521*a*, the inverted-phase clock signal line 522*a*, and the clock-signal phase difference correction circuit 500 may be disposed so as to overlap a part of the sealing area 52*a*, or so as to be completely covered with the frame light-shielding film 53. In any case, it is possible to reduce the space of the outer area than the periphery of the sealing area 52*a*, that is to say, the outer area than the periphery of the opposing substrate 20 disposed by being opposed to the TFT array substrate 10.

Next, a description will be given of an embodiment of a projection color display device, which is an example of an electronic system using the electro-optical apparatus described above in detail as a light valve, about the overall configuration thereof, and the optical configuration in particular. Here, FIG. 15 is a schematic sectional view of the projection color display device.

Figure 15:
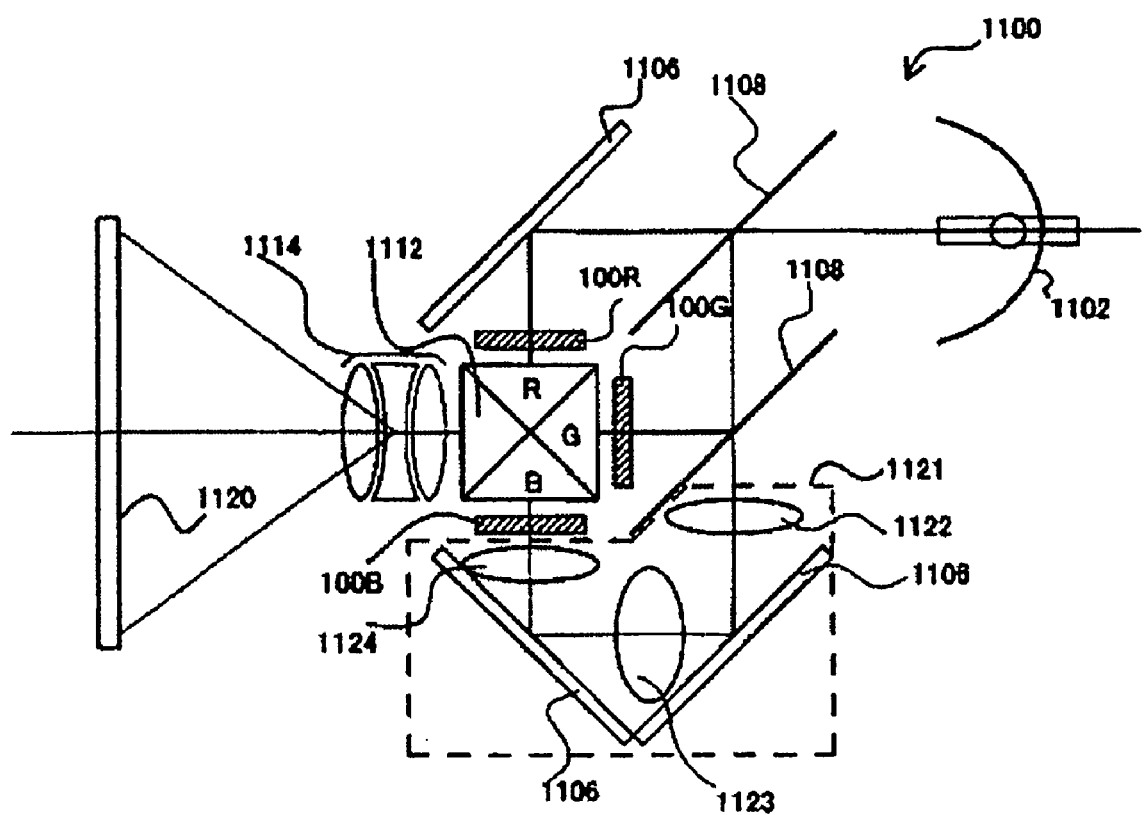
FIG. 15 is a schematic sectional view illustrating a color liquid-crystal projector, which is an example of a projection color display device, an embodiment of an electronic system of the present invention.

In FIG. 15, a liquid-crystal projector 1100, which is an example of a projection color display device according to the present embodiment, is provided with three pieces of liquid-crystal modules each including a liquid-crystal device with a drive circuit mounted on a TFT array substrate, and is constructed as a projector using the modules for RGB light valves 100R, 100G, and 10f, respectively. In the liquid-crystal projector 1100, when projection light is emitted from a white-light source lamp unit 1102, such as a metal halide lamp or the like, the light is separated into light components R, G, and B corresponding to three primary colors of RGB by three mirrors 1106 and two dichroic mirrors 1108, and guided to the light valves 100R, 100G, and 100B each of which corresponds to each color. At this time, in order to prevent light loss by a longer light path, the B light component is guided through a relay lens system 1121 which consists of an incident lens 1122, a relay lens 1123, and an exit lens 1124. Then the light components corresponding to the three primary colors, which are modulated by the light valves 100R, 100G, and 100B, respectively, are combined again by a dichroic prism 1112. Thereafter, the light is projected onto a screen 1120 as a color image through a projection lens 1114.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An electro-optical apparatus, comprising:
   in an image-display area on a device substrate,
   a plurality of data lines extending in a direction;
   a plurality of scanning lines extending in a direction intersecting the data lines; and
   in a surrounding area located on surroundings of the image-display area,
   a first drive circuit that drives wiring lines either of the scanning lines or the data lines based on a first clock signal and a second clock signal having a phase inverted from the first clock signal;

a second drive circuit that is disposed by being opposed to the first drive circuit across the image-display area, at the same time, is electrically coupled to the other ends of the wiring lines, and that drives the wiring lines based on the first and second clock signals;

first and second terminals to which the first and second clock signals are respectively supplied from an external circuit;

a phase-difference correction circuit that is provided between the first and second terminals and the first drive circuit and that corrects a phase difference between the first and second clock signals;

a first signal line which electrically couples the first terminal to the phase-difference correction circuit without branching, also electrically couples the phase-difference correction circuit to the first drive circuit without branching, supplies the first clock signal from the first terminal to the first drive circuit through the phase-difference correction circuit, at the same time, electrically couples the first drive circuit to the second drive circuit without branching, and supplies the first clock signal from the first drive circuit to the second drive circuit; and a second signal line which electrically couples the second terminal to the phase-difference correction circuit without branching, also electrically couples the phase-difference correction circuit to the first drive circuit without branching, supplies the second clock signal from the second terminal to the first drive circuit through the phase-difference correction circuit, at the same time, electrically couples the first drive circuit to the second drive circuit without branching, and supplies the second clock signal from the first drive circuit to the second drive circuit.

2. The electro-optical apparatus according to claim 1, further comprising a counter substrate disposed by being opposed to the device substrate, the device substrate and the counter substrate being bonded with each other by a sealing material in the surrounding area, and the first and second drive circuits being disposed in an inner area other than a periphery of a sealing area on which the sealing material is disposed.

3. The electro-optical apparatus according to claim 2, the phase-difference correction circuit being disposed in an inner area other than the periphery of the sealing area in the surrounding area.

4. The electro-optical apparatus according to claim 2, at least part of the first and second signal lines being disposed in an inner area other than the periphery of the sealing area in the surrounding area.

5. The electro-optical apparatus according to claim 2, a plurality of the first signal lines and a plurality of the second signal lines being arranged extending in a certain direction close to each other and by turns in part of the surrounding area.

6. An electro-optical apparatus, comprising:
in an image-display area on a device substrate:
a plurality of data lines extending in a direction;
a plurality of scanning lines extending in a direction intersecting the data lines; and
in a surrounding area located on surroundings of the image-display area:
a first drive circuit that drives wiring lines either of the scanning lines or the data lines based on a first clock signal and a second clock signal having a phase inverted from the first clock signal;

a second drive circuit that is disposed by being opposed to the first drive circuit across the image-display area, at the same time, is electrically coupled to other ends of the wiring lines, and that drives the wiring lines based on the first and second clock signals;

first and second terminals so that the first and second clock signals are respectively supplied from an external circuit;

a phase-difference correction circuit that is provided between the first and second terminals and the first and second drive circuits and that corrects a phase difference between the first and second clock signals;

a first signal line that electrically couples the first terminal to the phase-difference correction circuit without branching, also electrically couples the phase-difference correction circuit to the first and second drive circuits individually, and supplies the first clock signal from the first terminal to the first and second drive circuits individually through the phase-difference correction circuit; and a second signal line which electrically couples the second terminal to the phase-difference correction circuit without branching, also electrically couples the phase-difference correction circuit to the first and second drive circuits individually, and supplies the second clock signal from the second terminal to the first and second drive circuits through the phase-difference correction circuit.

7. An electro-optical apparatus according to claim 6, the phase-difference correction circuit being disposed at a position symmetrical to the first and second drive circuits.

8. An electro-optical apparatus according to claim 6, the first signal line electrically couples the phase-difference correction circuit to the first and second drive circuits individually without branching, and the second signal line electrically couples the phase-difference correction circuit to the first and second drive circuits individually without branching.

9. An electro-optical apparatus according to claim 6, further comprising a counter substrate disposed by being opposed to the device substrate, the device substrate and the counter substrate being bonded with each other by a sealing material in the surrounding area, and the first and second drive circuits being disposed in the surrounding area, in the inner area other than a periphery of a sealing area in which the sealing material is disposed.

10. An electro-optical apparatus according to claim 9, the phase-difference correction circuit being disposed in the inner area other than the periphery of the sealing area in the surrounding area.

11. An electro-optical apparatus according to claim 9, at least part of the first and second signal lines being disposed in the inner area other than the periphery of the sealing area in the surrounding area.

12. An electro-optical apparatus according to claim 6, a plurality of the first signal lines and a plurality of the second signal lines being arranged extending in a certain direction close to each other and by turns in part of the surrounding area.

13. An electronic system comprising an electro-optical apparatus according to claim 1.

* * * * *